United States Patent

Ro

Patent Number: 5,487,136
Date of Patent: Jan. 23, 1996

[54] METHOD AND CIRCUIT FOR PROCESSING DOT MATRIX IMAGE DATA IN A PAGE PRINTER

[75] Inventor: Ji-Ho Ro, Seoul, Rep. of Korea

[73] Assignee: SamSung Electronics Co., Ltd., Suwon, Rep. of Korea

[21] Appl. No.: 997,086

[22] Filed: Dec. 29, 1992

[30] Foreign Application Priority Data

Nov. 27, 1992 [JP] Japan ................... 1992-22635

[51] Int. Cl.⁶ .................................... B41J 2/51
[52] U.S. Cl. ........................... 395/108; 395/115
[58] Field of Search ............................ 395/157, 105, 395/100, 151, 116; 364/519; 400/124, 121; 358/296

[56] References Cited

U.S. PATENT DOCUMENTS

| | | | |
|---|---|---|---|
| 4,291,992 | 9/1981 | Barr et al. ........................ | 400/124 |
| 4,954,968 | 9/1990 | Yamaguchi et al. ............... | 364/519 |
| 5,043,918 | 8/1991 | Murahashi ....................... | 364/519 |
| 5,077,679 | 12/1991 | Williamson et al. .............. | 395/105 |
| 5,102,244 | 4/1992 | Takada ........................... | 400/121 |
| 5,115,493 | 5/1992 | Jeanblanc et al. . | |
| 5,146,547 | 9/1992 | Beck et al. ...................... | 395/116 |
| 5,146,592 | 9/1992 | Pfeiffer et al. .................. | 395/157 |
| 5,150,459 | 9/1992 | Kajimoto ........................ | 395/151 |
| 5,191,640 | 3/1993 | Plass ............................. | 395/100 |
| 5,207,517 | 5/1993 | Ito ............................... | 400/121 |
| 5,208,676 | 5/1993 | Inui .............................. | 358/296 |
| 5,216,754 | 6/1993 | Sathi et al. . | |

*Primary Examiner*—Mark R. Powell
*Assistant Examiner*—Steven P. Sax
*Attorney, Agent, or Firm*—Robert E. Bushnell

[57] ABSTRACT

A method and circuit for processing image data of a dot matrix printer in a page printer. Dot matrix image data is received and how many dots in the page printer correspond to one dot of the image data is calculated. A bit number representative of the location in vertical pins of a dot matrix printer head is initialized to a most significant pin number. A bit corresponding to the bit number of the input data is checked to form a line segment and the line segment is converted into raster data. Further, the raster data inserted in an image buffer, and data of the image buffer is stored in a symbolic buffer. A check is made to see if the bit number of the input data is a least significant pin number. If the bit number of the input data is not the least significant pin number, a next pin number is redesignated.

7 Claims, 5 Drawing Sheets

(PRIOR ART)

METHOD AND CIRCUIT FOR PROCESSING DOT MATRIX IMAGE DATA IN A PAGE PRINTER

BACKGROUND OF THE INVENTION

The present invention relates to a method and circuit for processing dot matrix image data in a page printer, and more particularly to a method and circuit capable of efficiently utilizing a memory space and reducing processing time when processing dot matrix image data in a page printer using a band buffering system.

Figure 4:
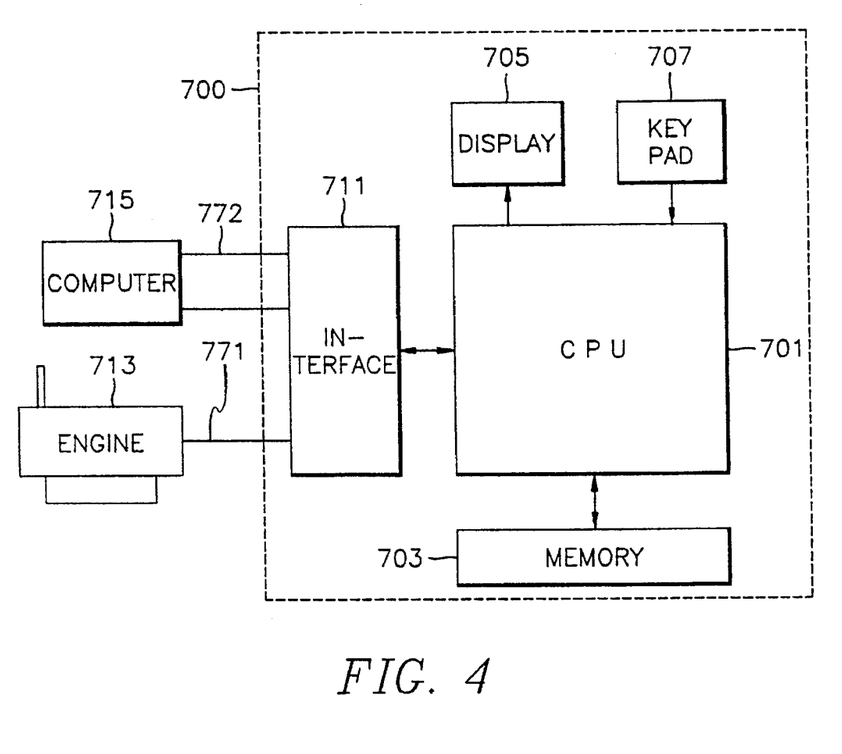
FIG. 4 is a block diagram of a printing system according to the present invention.

Generally, data of a dot matrix printer is easily processed in a page printer shown in FIG. 4. Referring to FIG. 4, the page printer has an engine 713 for printing an image, a controller 700 for controlling the engine 713, and a computer 715 for transferring various files to the controller 700. The controller 700 includes a central processing unit (CPU) 701 for controlling the whole part, an interface 711 connected to the CPU 701, the engine 713 and the computer 715, through serial and parallel ports 771 and 772, for transferring control signals and data, a key pad 707, a display unit 705, and a memory 703 for storing emulation data under the control of CPU 701. The memory 703 is divided into a ROM (Read Only Memory) in which an emulation program code is provided and a RAM (Random Access Memory) in which data is stored when the system is operating. The emulation program code consists of a kernel part for managing the whole resource of the controller 700 and an emulation program part for analyzing various printer control commands by the use of interface functions provided by the kernel part. Generally, since the kernel part is subjected to the system, it is positioned in the ROM. The emulation program is provided in the form of a cartridge in order to correspond to the various printer commands and the limited request by a user as well as the requirements for mutual processing by a page printer manufacturer.

In order to process the printing data of the dot matrix printer in the page printer, the data is accumulated in a given region, and the accumulated data is stored in a printing buffer of the memory 703 by the CPU 701 for the printing. The buffering method of the printing buffer is divided into full buffering and band buffering. In the full buffering system, a memory having the same size as the paper to be printed is provided in the printer. When the printing data fills the memory, the printing is performed. In the band buffering system, the printing position information in each band and a printing code corresponding thereto are linked, and the printing position information and printing code are moved into a predetermined region of a printer in order to be printed.

The band buffering system has been widely applied to video systems as disclosed in U.S. Pat. No. 4,679,038 of Bantz et al.

Figure 1:
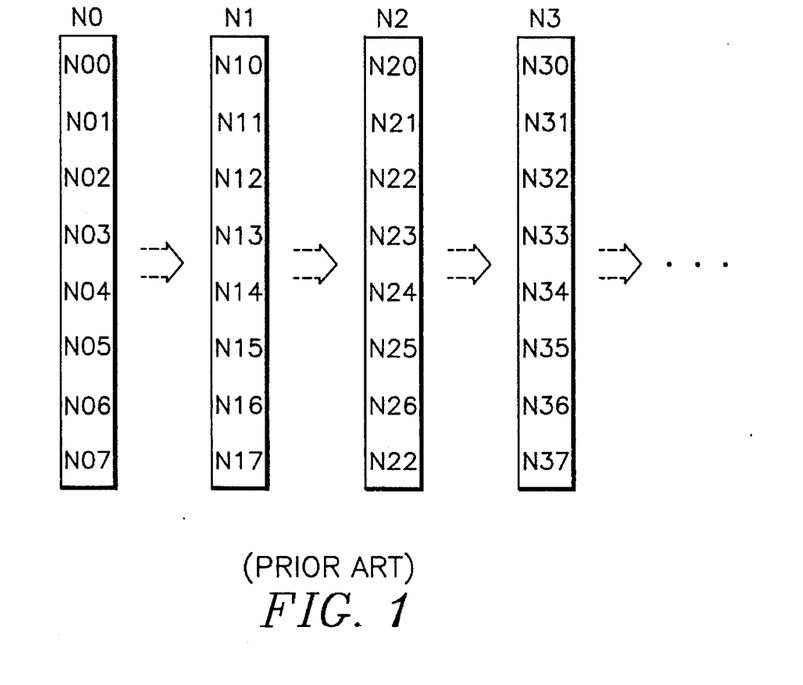
FIG. 1 is a diagram showing a conventional printing method of 8-pin image data.
Figure 2:
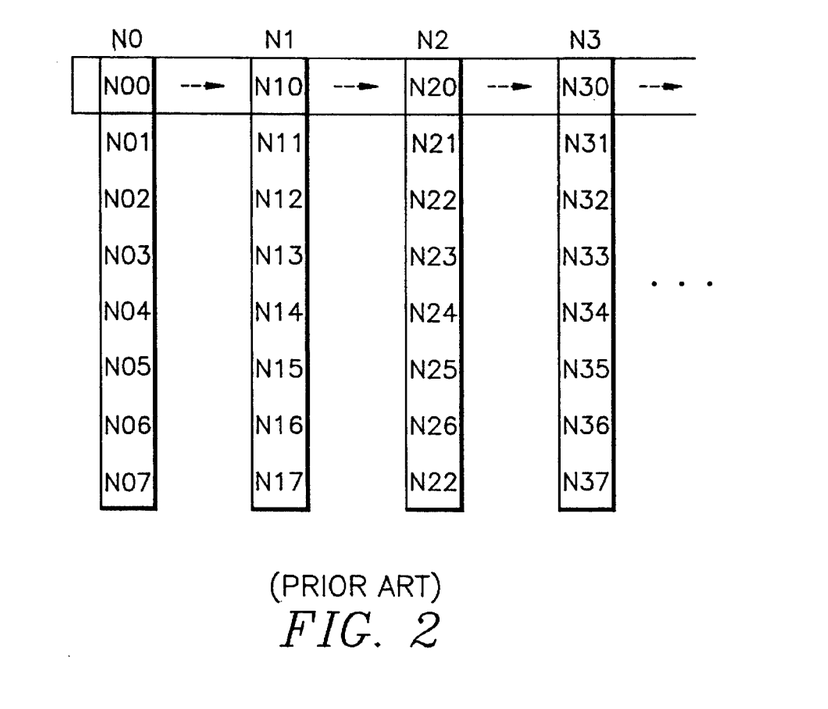
FIG. 2 is a diagram showing a scanning method of the 8-pin image data in a page printer.
Figure 3:
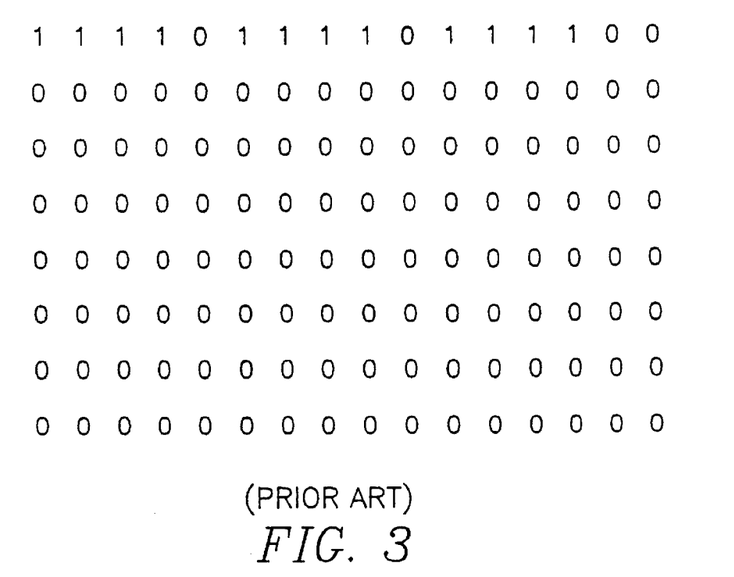
FIG. 3 is a diagram showing a forming method of line segments from the 8-pin image data.

The printing method in the dot matrix printer is illustrated in FIG. 1. In the case of a 9-pin printer, one pin is hardly used and 8 pins are used in printing. That is, in order to print one line, N number of serial dot image data is simultaneously printed in the order of N0 to N3 through the vertical 8 pins of a head as shown in FIG. 1. However, the page printer checks the location of bits of the image data, in order to process the data of a 9-pin dot matrix printer, as shown in FIG. 2. Then dots having a value of 1 are connected from the position of the first pin as indicated in FIG. 3. In this case, the interval of one dot is calculated at 5/300 inches to form line segments. Each line segment has information such as a start point, an end point, a thickness of a line and the like, and a memory of about 10 bytes is needed for storing the above information.

The line segment information file is processed through a frame buffer in the full buffering system and through a symbolic buffer in the band buffering system.

In a conventional image data processing method for a dot matrix printer, a scanning process such as is shown in FIG. 2 is required. However, since the scanning process is processed in unit of line segments, the number of line segments is altered according to the length and form of image data and therefore the processing time is delayed. On the other hand, since one dot constitutes one line segment, if the number of line segment differs, the memory size is also altered, thus requiring further memories. As a result, the efficiency of memory use is lowered and thus there are disadvantages in the band buffering system. For example, when processing a dotted line having the same 10 dots, line segments are equal to the number of dots. At this time, even if a buffering system is used, since a memory size corresponding thereto is needed, it is difficult to save the memory space.

SUMMARY OF THE INVENTION

An object of the present invention is to provide a method and circuit capable of efficiently using the memory space and reducing the processing time in a page printer using a band buffering system.

Another object of the present invention is to provide a method capable of performing enhanced functions and improving problems generated by the difference between dots per inch (DPI) of the image data by applying a raster graphic method in a page printer using a band buffering system.

According to one aspect of the present invention, a method for processing image data of a dot matrix printer in a page printer contemplates: receiving the image data of the dot matrix printer and calculating how many dots in the page printer correspond to one dot of the image data; initializing a bit number representative of the location of vertical pins in a dot matrix printer head to a most significant pin number; checking a bit corresponding to the bit number of the input data to form a line segment, converting the line segment into raster data, inserting the raster data into an image buffer, and storing data of the image buffer in a symbolic buffer; and checking whether the bit number of the input data is a least significant pin number, and redesignating a next pin number if the bit number of the input data is not the least significant pin number.

BRIEF DESCRIPTION OF THE DRAWINGS

For a better understanding of the present invention and to show the same may be carried into effect, reference will now be made, by way of example only, to the accompanying diagrammatic drawings, in which.

DETAILED DESCRIPTION OF THE PREFERRED EMBODIMENT

The emulation method for processing dot matrix image data in the page printer may be easily applied to the case of containing bit map image transmission in printer commands.

Figure 5:
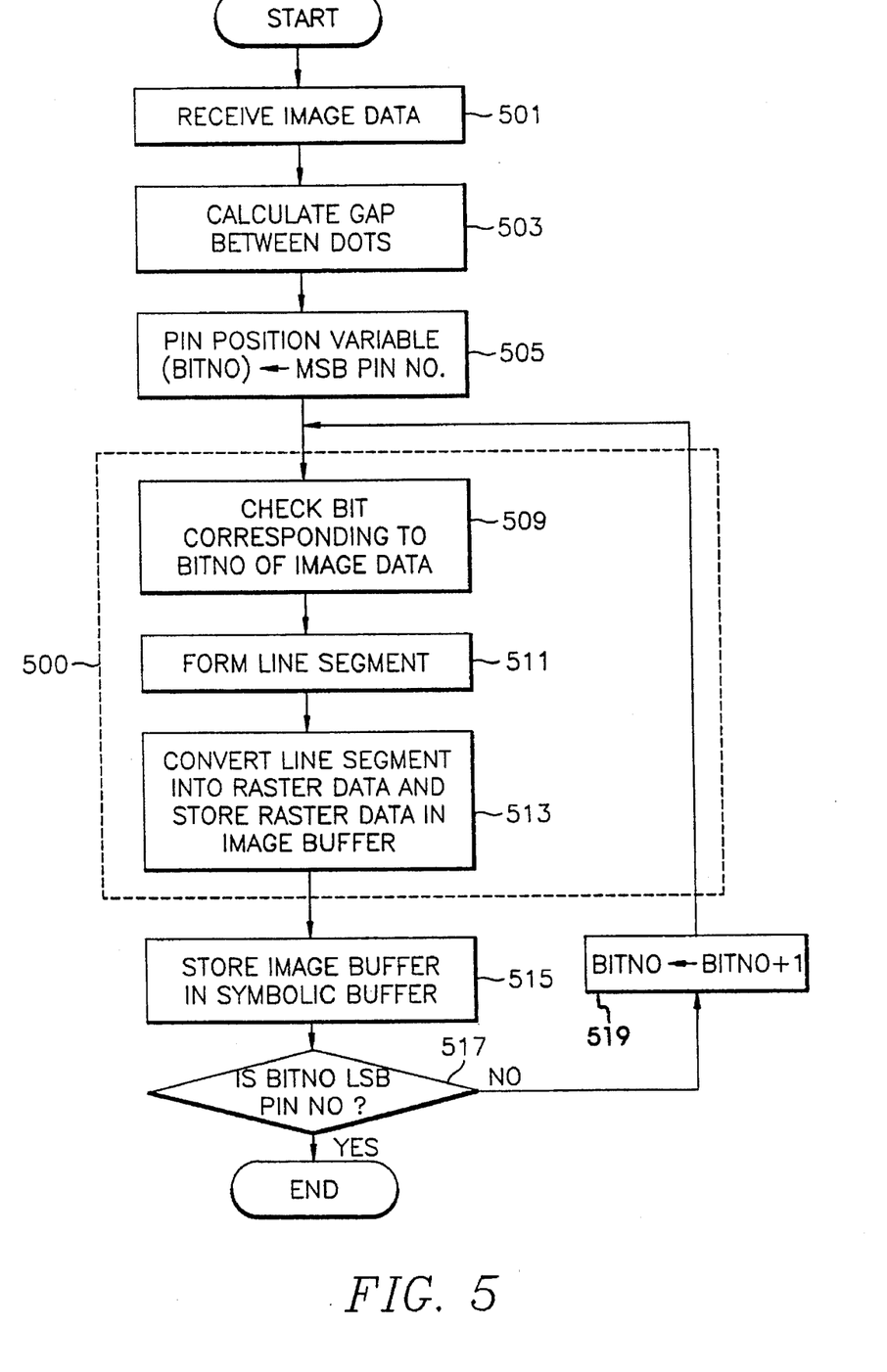
FIG. 5 is a flow chart showing a procedure for processing dot matrix image data in a page printer according to the present invention.

Referring now to FIG. 5, the CPU 701 receives, in step 501, the dot matrix image data through the interface 711 from the computer 715. The CPU 701 calculates, in step 503, how many dots in the page printer correspond to one dot of the dot matrix image data according to the resolution. The calculated result is used when forming a line segment in a subsequent process. In step 505, the CPU 701 initializes a pin position variable BITNO representing the position in the arrangement of vertical pins of the dot matrix printer header, to a most significant bit (MSB) pin number. Thereafter, pursuant to a process sequence 500 extending through steps 509, 511 and 513 which will be described in detail with reference to FIG. 6 later on, during step 509 a bit corresponding to the pin position variable BITNO of the input image data is checked and applied in step 511 to form a line segment, and subsequently in step 513 the line segment is converted into raster data and stored in an image buffer. In step 515, the line segment from the image buffer is stored in the symbolic buffer by the use of a typical symbol storing method used in band buffering. In step 517, a check is made to see if the pin position variable BITNO is a least significant bit (LSB) pin number. If it is the LSB pin number, the procedure is ended, and, if it is not the LSB pin number, step 517 advances to step 519. In step 519, the pin position variable BITNO is redesignated to a next pin number by incrementing the pin position variable BITNO by 1, and the procedure returns to step 509.

Figure 6:
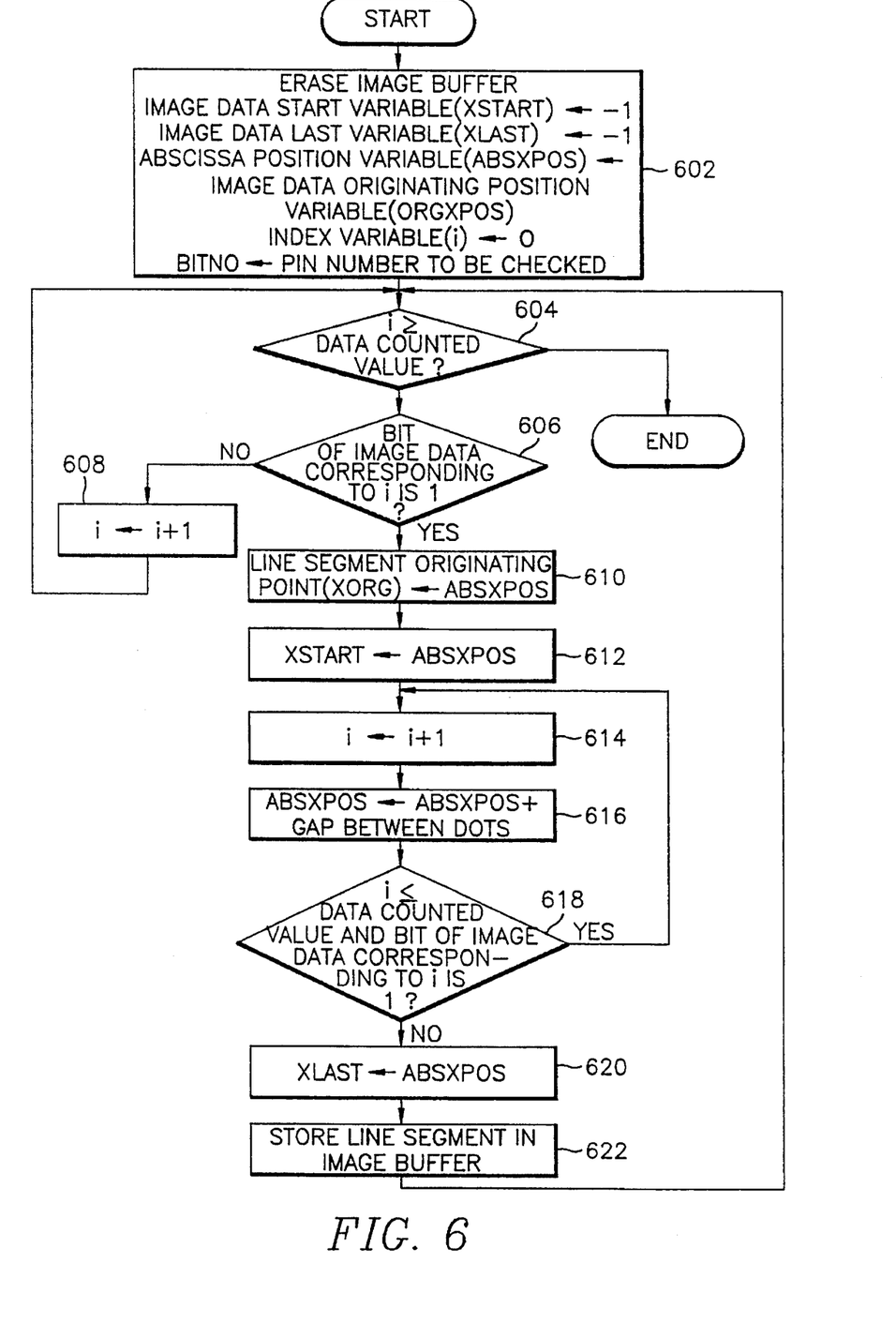
FIG. 6 is a flow chart showing a more detailed procedure of step 500 of FIG. 5.

Referring now to FIG. 6, step 602 shows the initialization of variables. Namely, the image buffer for storing image data is erased, and image data start and last variables XSTART and XLAST respectively designating the start and end points of the actually processed image data are initialized to −1. These variables are used in calculating the store location and length when the image data is stored in the symbolic buffer. An abscissa position variable ABSXPOS of a cursor is initialized to an image data originating position variable ORGXPOS. An index variable i representative of an index of the image data is initialized to 0, and the pin position variable BITNO is replaced with a pin number to be checked. Step 604 determines whether or not the index variable i is greater than or equal to a data counted value representing the magnitude of the input image data. That is, the CPU 701 checks whether or not the scanning of the input image data corresponding to the pin position variable BITNO is over. If the index variable i is greater than or equal to the data counted value, the procedure is ended. Otherwise, step 604 is followed by step 606 to see if a bit of the input image data corresponding to the index variable i is 1. If the bit is not 1, step 606 advances to step 608 to increment the index variable i by 1, and, if it is 1, step 606 proceeds to step 610 to replace a line segment originating point XORG with the abscissa position variable ABSXPOS.

Next, in step 612, the image data start variable XSTART is defined as the abscissa position variable ABSXPOS of a current cursor. This value is used as an originating point of actual image in a subsequent process. In step 614, the index variable i is incremented by 1, and in step 616, the abscissa position variable ABSXPOS is incremented by the gap between dots calculated in step 503 of FIG. 5. In step 618, a check is made to see if the index variable i is less than or equal to the counted value of the image data and if a bit of the image data corresponding to the index variable i is 1. If the index variable i is less than the counted value and if the bit of the image data corresponding to the index variable I is 1, the procedure loops steps 614, 616 and 618 to increment the length of the line segment. Otherwise, the step 618 proceeds to step 620 where the image data last variable XLAST is substituted for the abscissa position variable ABSXPOS of the cursor. In step 622, the line segment from the line segment originating point XORG to the image data last variable XLAST is stored in the image buffer. In this case, a general method for storing a line having a start point (X1, Y1) and an end point (X2, Y1) in a raster graphic is used.

Figure 7A:
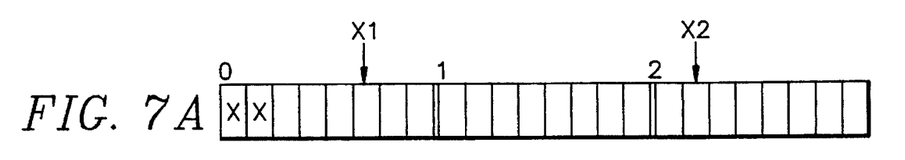
FIGS. 7A to 7F are diagrams showing examples for storing a line segment in an image buffer according to the present invention.
Figure 7B:
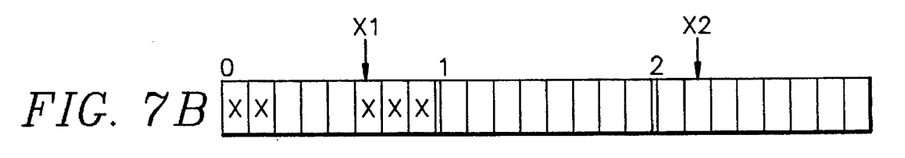
Figure 7C:
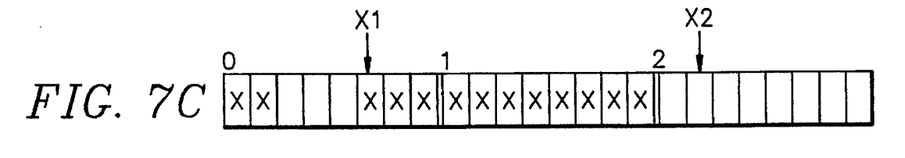
Figure 7D:
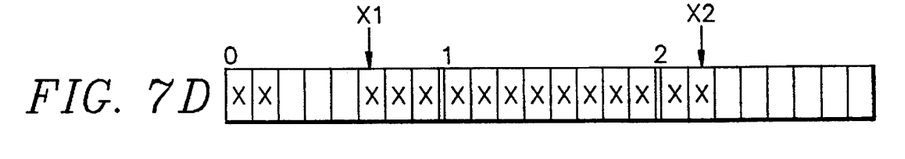
Figure 7E:
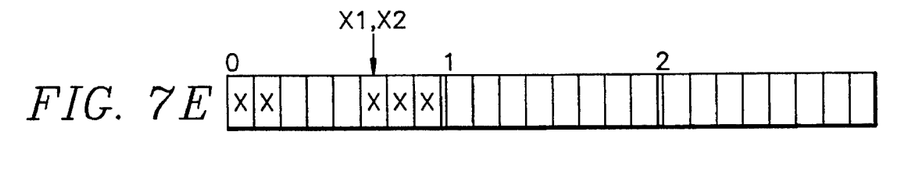
Figure 7F:
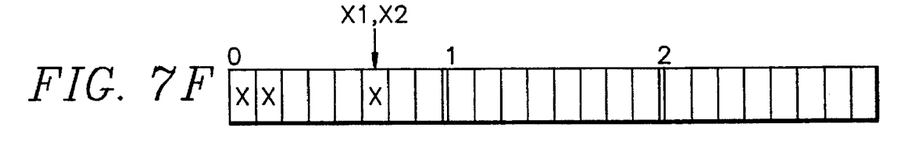

Referring to FIGS. 7A to 7F, examples for storing the line segment in the image buffer through step 622 of FIG. 6 are illustrated. The image buffer shown in FIGS. 7A to 7F has 3 bytes of eight bits each. In FIGS. 7B, 7C and 7D, the line segment is processed between first and second ranges X1 and X2 by byte unit. The first byte is automatically designated. FIG. 7B illustrates one example for processing the line segment from the first range X1 to a boundary point 1 of the first byte. In FIG. 7C, the line segment is processed for all the second byte. 3Xs (3 bits) of FIG. 7B, 8Xs (8 bits) of FIG. 7C and 2Xs (2 bits) of FIG. 7D are masked respectively. If the number of bits is 0 and 1, a masking value becomes 00H and 01H, respectively. Similarly, if the number of bits is 255, the masking value is FFH. In order to insert the masking value in a corresponding bit of a corresponding byte, the location of the insertion should be calculated. The location is obtained by dividing all the values of the image buffer by eight. For example, if the range X1 is five, the quotient of zero and the remainder of five are obtained by dividing five by eight and the location is thus determined to be the fifth bit of the first byte. Thus, if the location is determined, the masking value 03H is processed to fill Xs of three bits from the first range X1 as shown in FIG. 7B. In FIG. 7C, since sixteen is divided by eight, the quotient is one and the remainder is eight, and therefore, all the bits of the second byte are filled. Further, in FIG. 7D, since the quotient becomes two and the remainder two by dividing eighteen by eight, two bits up to the second range X2 are filled. In FIGS. 7E and 7F, the line segment is processed within a fixed boundary point on the basis of one byte.

As described above, since large quantity of image data is rapidly processed by the use of a raster graphic method, the memory space can be efficiently used and the processing speed improved in the page printer using band buffering system.

The foregoing description of a preferred embodiment and accompanying illustrations have been set out by way of example, not by way of limitation. Various modifications are apparent to those skilled in the art without departing from the spirit and scope of the present invention, its scope being defined in the appended claims.

What is claimed is:

1. A circuit for processing dot matrix image data for printing in a page printer, comprising:

means for receiving the dot matrix image data from a host computer;

means for determining how many dots in said page printer correspond to one dot of the dot matrix image data received;

means for initializing a pin position variable, indicative of a location of a pin among a plurality of vertical pins of a dot matrix printer head, to a most significant bit pin number;

means for forming a line segment by checking a bit of the image data corresponding to the pin position variable;

means for checking whether the pin position variable corresponds to a least significant bit pin number;

means for increasing the pin position variable by one when said pin position variable does not correspond to the least significant bit pin number and returning to said step of forming a line segment; and means for ending the processing of the dot matrix data when said pin position variable corresponds to the least significant bit pin number.

2. A circuit for processing dot matrix image data for printing in a page printer as claimed in claim 1, wherein said means for forming a line segment comprises:

means for initializing image data start and image data last variables to −1;

means for initializing an abscissa position variable of a cursor to an image data position variable;

means for initializing an image data index variable to 0;

means for setting said pin position variable to the pin number to be checked;

means for determining whether said image index variable is greater than or equal to a data counted value indicative of the magnitude of the image data;

means for stopping the processing of the image data when said image index variable is greater than or equal to the data counted value;

means for determining whether a bit of the image data corresponding to the the image index variable is equal to 1, when said image index variable is less the data counted value;

means for incrementing said image index value by one when said bit of the image data corresponding to the the image index variable is not equal to 1, and then returning to said step of determining whether said image index variable is greater than or equal to a data counted value indicative of the magnitude of the image data;

means for setting a line segment originating point equal and said image data start variable to said abscissa position variable when said bit of the image data corresponding to the the image index variable is 1; and then, means for incrementing said image index value by one;

means for incrementing said abscissa position variable by the number of dots determined in said first mentioned determining step;

means for determining whether the image index variable is less than said data counted value and when a bit of said image data is 1;

means for returning to said last mentioned step of incrementing said image index value when said image index variable is less than said data counted value and when said bit of said image data is 1;

means for setting said image data last variable to said abscissa position variable when said image index variable is not less than said data counted value and when said bit of said image data is not 1; and then means for storing, as said line segment in an image buffer, a line having a start point corresponding to said line segment originating point and and end point corresponding to said image data last variable.

3. A circuit for processing dot matrix image data for printing in a page printer as claimed in claim 1, further comprising:

means for erasing an image buffer;

means for converting said line segment into raster data;

means for inserting said raster data into said image buffer; and means for storing the image buffer into a symbolic buffer.

4. A circuit for processing dot matrix image data for printing in a page printer as claimed in claim 2, further comprising:

means for erasing said image buffer;

means for converting said line segment into raster data;

means for inserting said raster data into said image buffer; and means for storing the image buffer into a symbolic buffer.

5. A method for processing image data of a dot matrix printer in a page printer, comprising the steps of:

receiving the image data of said dot matrix printer and calculating how many dots in said page printer correspond to one dot of said image data;

initializing a bit number representative of the location in vertical pins of a dot matrix printer head to a most significant pin number;

checking a bit corresponding to the bit number of the input data to form a line segment, converting said line segment into raster data, inserting the raster data in an image buffer, and storing data of the image buffer in a symbolic buffer, wherein said line segment formation and data storage step comprises the steps of:

erasing the image buffer and initializing variables;

scanning the image data by comparing an index variable of the image data with a data counted value representative of the magnitude of the image data;

incrementing said index variable until a bit of the image data corresponding to said index variable is 1;

substituting a line segment originating point by an abscissa position of a current cursor and designating said abscissa position of a current cursor as an image data start point;

incrementing said index variable of the image data, incrementing said abscissa position of a current cursor according to the calculated gap between dots, and checking whether said index variable is less than said data counted value and the bit of the image data corresponding to said index variable is 1; and incrementing the length of the line segment if said index variable is less than said data counted value and the bit is 1, replacing an image data last point with said abscissa position of a current cursor if said index variable is greater than or equal to said data counted value, and storing the line segment in the image buffer; and checking whether the bit number of the input data is a least significant pin number, and redesignating a next pin number if the bit number of the input data is not the least significant pin number.

6. A circuit for processing image data of a dot matrix printer in a page printer comprising:

a first means for receiving the image data of said dot matrix printer and calculating how many dots in the page printer correspond to one dot of the image data;

a second means for initializing a bit number representative of the location in vertical pins of a dot matrix printer head to a most significant pin number;

a third means for checking a bit corresponding to the bit number of the input data to form a line segment, converting the line segment into raster data, inserting the raster data in an image buffer, and storing data of the image buffer in a symbolic buffer, wherein said third means comprises:

means for erasing the image buffer and initializing variables;

means for scanning the image data by comparing an index variable of the image data with a data counted value representative of the magnitude of the image data;

means for incrementing said index variable until a bit of the image data corresponding to said index variable is 1;

means for substituting a line segment originating point by an abscissa position of a current cursor and designating said abscissa position of a current cursor as an image data start point;

means for incrementing said index variable of the image data, incrementing said abscissa position of a current cursor according to the gap between dots, and checking whether said index variable is less than said data counted value and the bit of the image data corresponding to said index variable is 1; and means for incrementing the length of the line segment if said index variable is less than said data counted value and the bit is 1, replacing an image data last point with said abscissa position of a current cursor if said index variable is greater than or equal to said data counted value, and storing the line segment in the image buffer; and a fourth means for checking whether the bit number of the input data is a least significant pin number, redesignating a next pin number if the bit number of the input data is not the least significant pin number.

7. A method for processing dot matrix image data for printing in a page printer, comprising the steps of:

receiving the dot matrix image data from a host computer;

determining how many dots in said page printer correspond to one dot of the dot matrix image data received;

initializing a pin position variable, indicative of a location of a pin among a plurality of vertical pins of a dot matrix printer head, to a most significant bit pin number;

erasing an image buffer;

forming a line segment by checking a bit of the image data corresponding to the pin position variable, said step of forming a line segment comprises the steps of:

initializing image data start and image data last variables to −1;

initializing an abscissa position variable of a cursor to an image data position variable;

initializing an image data index variable to 0;

setting said pin position variable to the pin number to be checked;

determining whether said image index variable is greater than or equal to a data counted value indicative of the magnitude of the image data;

stopping the processing of the image data when said image index variable is greater than or equal to the data counted value;

determining whether a bit of the image data corresponding to the the image index variable is equal to 1, when said image index variable is less the data counted value;

incrementing said image index value by one when said bit of the image data corresponding to the the image index variable is not equal to 1, and then returning to said step of determining whether said image index variable is greater than or equal to a data counted value indicative of the magnitude of the image data;

setting a line segment originating point equal and said image data start variable to said abscissa position variable when said bit of the image data corresponding to the the image index variable is 1; and then, incrementing said image index value by one;

incrementing said abscissa position variable by the number of dots determined in said first mentioned determining step;

determining whether the image index variable is less than said data counted value and when a bit of said image data is 1;

returning to said last mentioned step of incrementing said image index value when said image index variable is less than said data counted value and when said bit of said image data is 1;

setting said image data last variable to said abscissa position variable when said image index variable is not less than said data counted value and when said bit of said image data is not 1; and then storing, as said line segment in said image buffer, a line having a start point corresponding to said line segment originating point and and end point corresponding to said image data last variable;

converting said line segment into raster data;

inserting said raster data into said image buffer;

storing the image buffer into a symbolic buffer;

checking whether the pin position variable corresponds to a least significant bit pin number;

increasing the pin position variable by one when said pin position variable does not correspond to the least significant bit pin number and returning to said step of forming a line segment; and ending the processing of the dot matrix data when said pin position variable corresponds to the least significant bit pin number.

* * * * *

UNITED STATES PATENT AND TRADEMARK OFFICE
CERTIFICATE OF CORRECTION

Page 1 of 3

PATENT NO. : 5,487,136
DATED : January 23, 1996
INVENTOR(S) : Ji-Ho Ro

It is certified that error appears in the above-indentified patent and that said Letters Patent is hereby corrected as shown below:

IN THE TITLE PAGE

[30]  Foreign Application Priority Data

Change "[JP] Japan" to --[KR] Rep. of Korea--:

Column 2

Line 10,    after "in", change "unit" to --units--;

Line 14,    preceding "differs", change "segment" to --segments--;

Line 21,    after "save", delete "the";

Column 4

Line 12,    after "variable", change "I" to -- i --;

UNITED STATES PATENT AND TRADEMARK OFFICE
CERTIFICATE OF CORRECTION

PATENT NO. : 5,487,136
DATED : January 23, 1996
INVENTOR(S) : Ji-Ho Ro

It is certified that error appears in the above-indentified patent and that said Letters Patent is hereby corrected as shown below:

IN THE CLAIMS

Column 5

Line 39,    after "corresponding to", delete "the" (the first occurrence);

Line 43,    after "corresponding to", delete "the" (the first occurrence);

Line 52,    after "corresponding to", delete "the" (the first occurrence);

Column 6

Line 5,    preceding "end", change "and" (the second occurrence) to --an--;

Column 8

Line 13,    after "corresponding to", delete "the" (the first occurrence);

Line 17,    after "corresponding to", delete "the" (the first occurrence);

UNITED STATES PATENT AND TRADEMARK OFFICE
CERTIFICATE OF CORRECTION

PATENT NO. : 5,487,136
DATED : Janaury 23, 1996
INVENTOR(S) : Ji-Ho Ro

It is certified that error appears in the above-indentified patent and that said Letters Patent is hereby corrected as shown below:

IN THE CLAIMS

Column 8

Line 25, after "corresponding to", delete "the" (the first occurrence);

Line 42, preceding "end", change "and" (the second occurrence) to --an--:

Signed and Sealed this

Fourteenth Day of May, 1996

Attest:

BRUCE LEHMAN

*Attesting Officer*     *Commissioner of Patents and Trademarks*